United States Patent [19]
Goellner

[11] Patent Number: 4,463,645
[45] Date of Patent: Aug. 7, 1984

[54] CIRCULAR SAW

[75] Inventor: Willy J. Goellner, Rockford, Ill.

[73] Assignee: Speedcut, Inc., Rockford, Ill.

[21] Appl. No.: 468,452

[22] Filed: Feb. 22, 1983

[51] Int. Cl.³ .............................................. B23D 61/04
[52] U.S. Cl. ........................................ 83/852; 83/855;
 407/60; 407/61; 407/100
[58] Field of Search ...................... 407/33, 51, 55, 56,
 407/58, 60, 61, 100, 114; 83/835–355, 676;
 76/112; 30/347, 355

[56] References Cited
U.S. PATENT DOCUMENTS

| | | | |
|---|---|---|---|
| 2,278,738 | 4/1942 | Praeg ...................................... | 407/61 |
| 3,576,061 | 4/1971 | Pahlitzsch ............................. | 407/60 |
| 4,060,880 | 12/1977 | Nowak ................................... | 407/61 |
| 4,068,976 | 1/1978 | Friedline .............................. | 407/114 |
| 4,133,240 | 1/1979 | Vollmer ............................ | 83/835 X |

Primary Examiner—James M. Meister
Attorney, Agent, or Firm—Vernon J. Pillote

[57] ABSTRACT

A circular saw having dual chip cutting action in which all of the saw teeth are of like width and radial height and have similar tooth geometry with the working surface of the leading tooth face disposed at a negative rake angle and having side portions extending outwardly and rearwardly from a central portion at a negative angle to the side faces of the tooth. A single notch is formed in the top face of each tooth and intersects the working surface, and the notch in alternate ones of the saw teeth are disposed at one side of the central plane of the saw body and the notch in the other alternate ones of the saw teeth are disposed at the other side of the central plane of the saw body.

7 Claims, 6 Drawing Figures

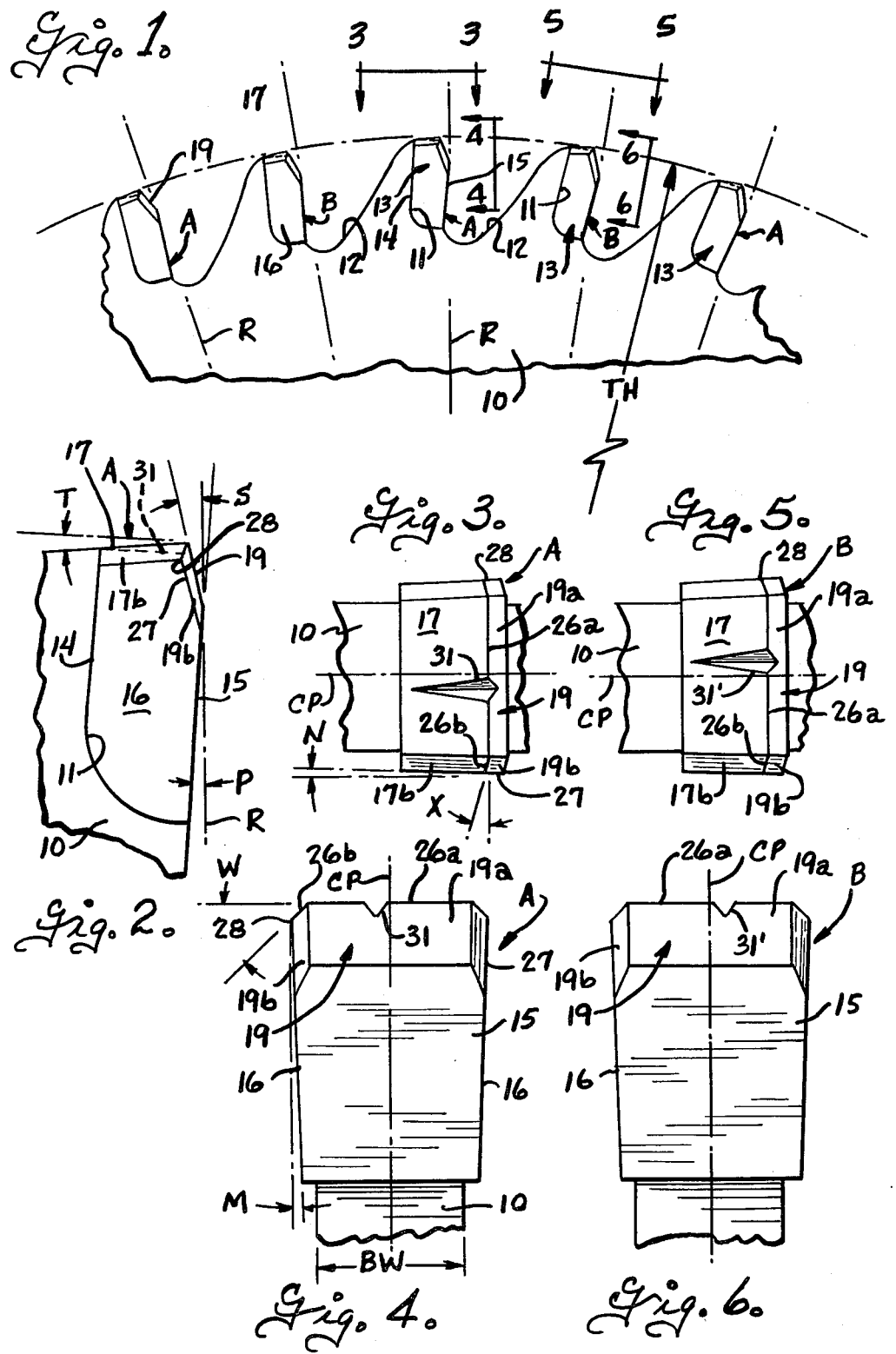

CIRCULAR SAW

BACKGROUND OF THE INVENTION

U.S. Pat. No. 3,576,061, discloses a circular saw having an improved metal cutting geometry which enables relatively high speed cutting of hard ferrous metals and the like. The saw in this patent has teeth formed with a negatively raked front working face having a central portion and side portions that extend symmetrically laterally outwardly and backwardly at a negative angle from the central portion to the side faces of the tooth. U.S. Pat. Nos. 4,064,880 and 4,133,240 disclose saws having cutting teeth with modified forms of the above-described tooth geometry. Saws with teeth having the above-described geometry generate a large amount of heat in the cutting process and so much heat goes into the chip that the chip is normally red hot when it is formed. The chip therefore expands in width and tends to jam in the groove or curve being formed by the saw. In order to prevent jamming of the chips in the groove, the saws in the above patents each use a triple chip style saw tooth pattern having alternate high and low teeth of relatively different cutting width. In the triple chip tooth patterns, the leading high tooth normally removes the chip along the center of the kerf while the trailing low tooth removes two chips flanking the center chip. Thus, the triple chip style saw pattern uses two successive teeth to remove a chip across the full width of the kerf or saw cut. While the tooth geometry in the above patents provides improved cutting action in hard ferrous materials and the like, the triple chip style saw tooth pattern which uses two successive teeth to cut a single chip across the width of the kerf, does limit the cutting speed that can be obtained with a given rate of feed per tooth per revolution and a given cutter speed. Further, the triple chip style cutting tooth pattern also increases tooth chatter and vibration, especially when making interrupted cuts such as in structural shapes and tubing, since successive teeth in the triple chip tooth pattern have different size and shape.

SUMMARY OF THE INVENTION

It is an object of the present invention to overcome the disadvantages of the prior art saws for cutting hard ferrous materials and the like and which utilize a triple chip style saw tooth pattern by providing a circular saw in which each tooth makes a cut that extends the width of the kerf and divides the chip into two pieces to prevent jamming of the hot chip in the kerf.

Accordingly, the present invention provides a circular saw having dual chip cutting action comprising a disk like saw blade and a plurality of saw teeth of carbide material attached to the blade body at circumferentially spaced locations, all of the saw teeth being of like width and radial height and each including side faces spaced outwardly from the opposite sides of the saw blade body and a top tooth face and leading tooth face, the leading tooth face including an outer working surface disposed at a negative rate angle and intersecting the top tooth face along a top cutting edge, the outer working surface having a central portion and side portions extending symmetrically relative to the central plane of the saw blade body backwardly and outwardly from the central portion to the side faces of the tooth, each of the saw teeth having a single notch in its top face intersecting the working surface of the leading tooth face, the notch in alternate ones of the saw teeth being disposed at one side of the central plane of the saw blade body and the notch in the other alternate ones of the saw teeth being disposed at the other side of the central plane of the saw blade body.

Since each tooth of the saw make a cut that extends the width of the kerf, the rate of feed of the stock to the saw having a given number of teeth and operated at a given rate of feed per tooth and cutter speed, can be markedly increased over saws using triple chip style saw tooth pattern. Further, the cutting action of the saw is substantially smoother than saws using the triple chip style saw tooth pattern, particularly in making interrupted cuts on structural shapes and tubing.

These, together with other objects, features and advantages of this invention will become apparent from the following detailed description when taken in connection with the accompanying drawings wherein:

FIG. 1 is a fragmentary side view of the periphery of a saw blade embodying the present invention;

FIG. 2 is a fragmentary side elevational view of one saw tooth on a larger scale than FIG. 1;

FIG. 3 is a fragmentary view taken on the plane 3—3 of FIG. 1 and illustrating the top of one saw tooth on a larger scale than FIG. 1;

FIG. 4 is a fragmentary sectional view taken on the plane 4—4 of FIG. 1 and illustrating the lead face of the saw tooth of FIG. 3;

FIG. 5 is a fragmentary view taken on the plane 5—5 of FIG. 1 and illustrating the top of a second saw tooth on a larger scale than FIG. 1; and FIG. 6 is a fragmentary sectional view taken on the plane 6—6 of FIG. 1 and illustrating the lead face of the saw tooth of FIG. 5.

Referring to FIG. 1, the saw is made with a thin circular disk 10 of conventional saw blade steel and has circumferentially spaced pockets 11 separated by gullets 12. A plurality of cutting teeth saw tooth inserts 13 of a very hard and durable material such as tungsten carbide are positioned in each of the pockets 11 and secured as by brazing to the saw blade body to provide a plurality of saw teeth at uniformily spaced locations around the periphery of the saw blade body. The saw teeth comprise teeth A and B arranged in alternate sequence around the periphery of the saw blade body. Alternate teeth A are arranged to cut two chips of unequal size from the width of the kerf with the smaller chip at one at one side of the kerf, and the other alternate saw teeth B are arranged to cut two chips of unequal size from the kerf with the smaller chip located adjacent the other side of the kerf.

All of the saw teeth A and B have a similar saw tooth geometry and are of like width and radial height, and like numerals are used to designate the same parts of the saw teeth A and B. While the size of the saw blade and teeth can vary in different applications, the saw teeth are preferably made relatively narrow to minimize the amount of material which must be removed in making the saw cut. In order to facilitate illustration, the saw and saw teeth are shown on an enlarged scale in the drawings with the scale of FIGS. 2-6 being approximately five times full size.

The saw teeth A and B each have a rear face 14 positioned and secured in a respective one of the pockets 11 on the saw blade body, a leading face 15, side faces 16 and a top face 17. The teeth are wider than the saw blade body and the opposed side faces 16 are spaced outwardly from the opposite sides of the blade body. For example, the body width BW can be 0.220 inches and the tooth width TW of the teeth A and B about 0.290 inches. The side faces 16 are preferably ground to extend from the maximum tooth width TW downwardly and inwardly toward the axis of the saw at a small clearance angle designated M in FIG. 4, for example of the order of one to two degrees, and to also extend backwardly and inwardly at a shallow side clearance angle N as shown in FIG. 3, which can also be of the order of one to two degrees. The front face 15 of each of the teeth A and B has a positive rake angle designated P in FIG. 2, and the front working surface 19 at the radially outer portion of the leading face 15 has a negative rake angle designated S relative to a radial plane R extending through the saw blade axis and contacting the foremost point on the cutting tooth. The negative rake angle S may be from 2° to about 25°, but is preferably around 10° to 15°. The front working surface 19 has a central portion 19a and side portions 19b that extend backwardly and outwardly from the central portion to the side faces 16 of the tooth. The central portion 19a is preferably of planar configuration and the side portions 19b are also preferably of planar configuration and extend backwardly and outwardly at a negative angle relative to the central portion 19a, which negative angle may be between 5° and 45° and preferably is in the range of 10° to 15°. The widths of the central portion 19a can be varied in relation to the width of the side portions 19b, but the central portion preferably extends a major portion of the width of the tooth. The top face 17 of the tooth extends rearwardly and inwardly at a clearance angle designated T relative to a plane perpendicular to the radial plane R, which clearance angle is made somewhat less than the negative rake angle S so that the included angle between the top face 17 and front working face 19 is greater than 90°. For example, with the front working face 19a disposed at a negative rake angle S of 13°, the clearance angle T can be 8°. The top tooth face 17 is preferably of planar configuration throughout the major width of the tooth and, in the embodiment shown, has a planar portion about the same width as the central portion 19a of the working surface. Side portions 17b of the top tooth face 17 are beveled downwardly and outwardly to the side faces 16 at an angle designated W in FIG. 4. The angle W can be varied over a wide range but is preferably about 45°.

The central portion 19a of the working surface 19 on the lead side of the tooth intersects the top wall 17 along a central shear edge portion 26a and the side portions of the outer working surface intersects the top tooth face along side shear edge portions 26b that extend at a negative angle X relative to a radial plane through the central portion shear edge 26a. The side portions 19b also intersect the side walls 16 of the tooth along a shear edge 27. The corner 28, at which the shear edges 26b and 27 intersect, is the point of maximum tooth width TW.

The tooth geometry of the cutting teeth as thus far described is the same for both cutting teeth A and B, and the teeth A and B have the same tooth width TW and cutting edges of the teeth A and B are disposed at the same tooth height designated TH in FIG. 1, measured radially from the center of the saw. Thus, both the cutting teeth A and B cut a kerf of the same width. The alternate teeth A are arranged to cut two chips of unequal size, with the small size chip being cut at one side of the kerf and the other alternate cutting teeth B are arranged to cut two chips of unequal size, with the small size chip located at the other side of the kerf. As best shown in FIGS. 3-6, a single notch 31 is formed in the top face of the jaw 17 and intersects its front working face 19a, which notch is disposed at one side of the central plane CP, of the saw blade. The other teeth B have a notch designated 31' formed in their top face 17 and which intersects the front working face 19a at a location disposed at the upper side of the central plane CP. The notches 31 and 31' are formed with a shallow V-shaped cross section and have a depth greater than the maximum rate of feed per tooth that is to be used in the cutting operation. For example, the notches can extend to a depth of about 0.016 inches below the cutting edge 26a. As previously described, the top face 17 of the cutting tooth extends backward from the cutting edge 26a at a clearance angle T. The notches 31, 31' in the teeth A and B respectively are preferably formed so as to decrease in depth in a direction away from the outer working face of the tooth as shown in FIGS. 2, 3 and 5.

Since the notches 31, 31' have a depth greater than the maximum rate of feed per tooth to be used in the cutting operation, the shear edges 26a, 26b of cutting teeth A shear off two chips of unequal width, with the smaller chip being formed at one side of the kerf of the workpiece and the wider chip being formed at the other side of the kerf. The notch 31 in each A tooth leaves a small wedge-shaped piece in the base of the kerf at one side of the central plane CP of the saw blade, at the left as shown in FIG. 4. The succeeding cutting tooth B has its notch 31' offset to the right of the central plane CP as viewed in FIG. 6 and the blade B will therefore cut a wide chip from the left side of the kerf and a relatively narrower chip from the right side of the kerf and leave a small rib in the area traversed by the notch 31'. Thus, each of the teeth A cut two chips from the kerf and leave a small ridge in the base of the kerf at one side of its central plane of the saw and the other alternate teeth B cut two chips about equal size from the kerf and remove the ridge left by the preceding tooth but themselves leave a small ridge at the base of the kerf at the other side of the central plane of the saw. Since the teeth each cut two separate chips from the kerf, the chips can divide and fall into the gullet between the teeth without binding between the side walls of the kerf.

Since each of the teeth A and B cut the full width of the kerf, higher overall cutting speeds, up to about twice the speeds possible with saws using alternate high and low teeth of different width, using the same total number of saw teeth and the same feed rate per tooth and cutter speed. Alternatively, the feed rate per tooth and/or the cutter speed can be reduced somewhat, for example a twenty-five percent reduction to achieve longer tool life, and still obtain higher overall cutting speeds. Further, since each of the teeth A and B cut the full width of the kerf, they provide a smoother cutting action and reduce vibration and chattering, especially when making interrupted cuts through structural forms and tubing. In addition, since each of the teeth A and B cut the full width of the kerf, even if one cutter is damaged by a chip or break, the saw can still be operated to cut at a cutting speed substantially as good as saws with a triple chip pattern having high and low teeth of different size.

The embodiments of the invention in which an exclusive property or privilege is claimed are defined as follows:

1. A circular saw having dual chip cutting action comprising, a disk-like saw blade body, a plurality of saw teeth of carbide material attached to the saw blade body at circumferentially spaced locations, all of the saw teeth being of like width and radial height and each including side faces spaced outwardly from opposite sides of the saw blade body and a top tooth face and a leading tooth face, the leading tooth face including an outer working surface disposed at a negative radial rake angle and intersecting said top tooth face along a top cutting edge, said center working surface having central portion and side portions extending symmetrically relative to the central plane of the said blade body outwardly and backwardly at a negative angle from the central portion to the side faces of the tooth, each of the saw teeth having a single notch in the top face intersecting the working surface of its leading tooth face, the notch in alternate ones of the saw teeth being disposed at one side of the central plane of the saw blade body and the notch in the other alternate ones of the saw teeth being disposed at the other side of the central plane of the saw blade body.

2. A circular saw according to claim 1 wherein said notches in the top tooth faces intersect said central portion of the outer working surface.

3. A circular saw according to claim 2 wherein said top tooth face has a generally planar central portion that extends backward from the outer working surface at a clearance angle and downwardly and outwardly beveled side portions that intersect the side faces of the tooth.

4. A circular saw according to claim 1 wherein said top tooth face has a generally planar central portion that extends backward from the outer working surface at a clearance angle and downwardly and outwardly beveled side portions that intersect the side faces of the tooth.

5. A circular saw having a dual chip cutting action comprising: a disk-like saw blade body, a plurality of saw teeth attached to the saw blade body at circumferentially spaced locations, all of said saw teeth being of like width and radial height and each including side faces spaced outwardly of opposite sides of the saw blade body and a top tooth face and a leading tooth face, the leading tooth face including an outer working surface disposed at a negative radial rake angle, said outer working surface having a planar central portion and planar side portions extending symmetrically relative to the central plane of the saw tooth body outwardly and backwardly at a negative angle from the central portion to the side faces of the tooth, said central portion of the outer working surface intersecting said top tooth face along a central shear edge portion paralleling the blade axis and said side portions of the center working surface intersecting the top tooth face along side shear edge portions that extend outwardly and backwardly from the central shear edge portion, each of the saw teeth having a notch in its top tooth face intersecting the outer working surface of its leading tooth face, the notch in alternate ones of the saw teeth being disposed at one side of the central plane of the saw blade and the notch in the other alternate ones of the saw teeth being disposed at the other side of the central plane of the saw blade.

6. A circular saw according to claim 5 wherein said planar central portion of the outer working surface extends a major portion of the width of the outer working surface, the notch in the top tooth face intersecting the central portion of the outer working surface.

7. A circular saw according to claim 6 wherein said top tooth face is planar over a major portion of width of the tooth and extends backward from the outer working surface at a clearance angle and the top tooth face has downwardly and outwardly beveled side portions that intersect the side faces of the tooth.

* * * * *